United States Patent
Lee et al.

(10) Patent No.: US 12,491,849 B2
(45) Date of Patent: Dec. 9, 2025

(54) METHOD FOR DETECTING STATIONARY OBJECTS BY VEHICLES MOVING AT HIGH SPEED

(71) Applicant: Metal Industries Research & Development Centre, Kaohsiung (TW)

(72) Inventors: Tsung-Han Lee, Kaohsiung (TW); Jinn-Feng Jiang, Kaohsiung (TW); Shih-Chun Hsu, Kaohsiung (TW); Tsu-Kun Chang, Kaohsiung (TW); Cheng-Tai Lei, Kaohsiung (TW); Hung-Yuan Wei, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 18/765,847

(22) Filed: Jul. 8, 2024

(65) Prior Publication Data
US 2025/0170996 A1 May 29, 2025

(30) Foreign Application Priority Data
Nov. 29, 2023 (TW) ................. 112146259

(51) Int. Cl.
| | |
|---|---|
| *B60T 8/172* | (2006.01) |
| *B60Q 9/00* | (2006.01) |
| *G06T 7/20* | (2017.01) |
| *G06T 7/55* | (2017.01) |
| *G06V 20/58* | (2022.01) |

(52) U.S. Cl.
CPC ................ *B60T 8/172* (2013.01); *B60Q 9/00* (2013.01); *G06T 7/20* (2013.01); *G06T 7/55* (2017.01); *G06V 20/58* (2022.01); *G06T 2207/10028* (2013.01); *G06T 2207/20221* (2013.01); *G06T 2207/30261* (2013.01)

(58) Field of Classification Search
CPC .. B60T 8/172; B60Q 9/00; G06T 7/20; G06T 7/55; G06T 2207/10028; G06T 2207/20221; G06T 2207/30261; G06V 20/58
See application file for complete search history.

(56) References Cited

U.S. PATENT DOCUMENTS

2024/0176353 A1* 5/2024 Lee ................... B60R 21/0134

* cited by examiner

*Primary Examiner* — Xiao En Mo
(74) *Attorney, Agent, or Firm* — WPAT, PC

(57) ABSTRACT

The present invention provides a method for detecting stationary objects by vehicles moving at high speed. The method is applied to a vehicle, which includes an on-board computer, a depth image capture unit, a laser image capture unit, and an optical image capture unit. When the vehicle moves at a first speed, the depth image capture unit, the laser image capture unit, and the optical image capture unit captures a depth image, a laser image, and an optical image. The on-board computer merges the depth image, the laser image, and the optical image according to give a merged image. Then on-board computer analyzes and judges the stationary object in the merged image according to an image optical flow method and generating stationary object information. The on-board computer displays alarm messages and the stationary object on the display unit of the vehicle according to the stationary object information.

9 Claims, 8 Drawing Sheets

S10 — When the vehicle moves at a first speed, the depth image capture unit, the laser image capture unit, and the optical image capture unit independently capturing a depth image, a laser image, and an optical image of a front side of the vehicle, respectively.

S20 — The on-board computer receiving and merging the depth image, the laser image, and the optical image according to a fusion algorithm to give a merged image.

S30 — The on-board computer analyzing and judging a stationary object in the merged image according to an image optical flow method and generating stationary object information including a relative distance between the stationary object and the vehicle and a second speed of the stationary object.

S40 — When the relative distance is smaller than a distance threshold value and the second speed is smaller than a speed threshold value, the on-board computer generating an alarm message.

Fig.1

METHOD FOR DETECTING STATIONARY OBJECTS BY VEHICLES MOVING AT HIGH SPEED

BACKGROUND OF THE INVENTION

With the advancement of technology, a variety of vehicles have been frequently used in our daily lives. However, no matter what kind of vehicle, it is necessary to control the vehicle through driving. In order to avoid traffic accidents caused by human operation errors, the complicated technology of "self-driving" emerged. Self-driving is not just a cool symbol in science fiction movies. Its existence can improve our future life.

To put it simply, self-driving is a vehicle equipped with many sophisticated sensors that can automatically sense the surrounding environment and navigate automatically without human intervention. If a self-driving car is compared to a person, the sensor is like an eye, which can sense the surrounding road environment. After the eye sees it, through the decision-making mechanism like the brain, the built-in computing system calculates and selects the driving route. Then, through the control system, which acts like hands and feet, the functions such as braking and accelerator can be controlled.

Self-driving cars can sense their environment using technologies such as radar, lidar, sensors, GPS, and computer vision. Advanced control systems convert sensor data into appropriate navigation paths, as well as obstacles and related signs. Through simultaneous positioning and map construction technology, its map information is updated so that transportation vehicles can continuously track their location. An unmanned fleet composed of multiple self-driving vehicles can effectively reduce traffic pressure and thus improving the transportation efficiency of the transportation system.

In the United States, the National Highway Traffic Safety Administration has proposed a formal five-level classification system for self-driving:

Level 0: No automation. The driver has control over all mechanical and physical functions of the vehicle at all times, including functions that have nothing to do with spontaneous driving such as alarm devices.

Level 1: Driving assistance. The driver operates the vehicle, but individual devices sometimes come into play, such as electronic stability program (ESP) or anti-lock braking system (ABS) to help drive safely.

Level 2: Partial automation. The driver mainly controls the vehicle, but the system is partially automated, which significantly reduces the operational burden. For example, the active cruise control (ACC) combines automatic following and lane departure warning, while the automatic emergency braking (AEB) uses blind spot detection to integrate with some technologies of automobile anti-collision system.

Level 3: Conditional automation. The driver needs to be ready to control the vehicle at any time. During the self-driving assistance control, although the operation can be temporarily exempted when following a car, when the car detects a situation that requires the driver, it will immediately return to let the driver take over its subsequent control. The driver must take over when the system is unable to handle the situation.

Level 4: High automation. The driver can let the vehicle drive completely by itself if conditions permit. After starting the self-driving, there is generally no need to intervene in the control. The vehicle can follow the set road rules (such as smooth traffic flow, standardized road signs, and obvious prompt lines on the highway) and perform tasks including turning, lane changing, and accelerating except for harsh weather or unclear roads, accidents, or the end of the self-driving road section. The system also provides the driver with sufficient switching time. The driver should monitor vehicle operations, including unmanned parking functions with monitoring. (For automatic cars with the steering wheel)

Level 5: Full automation. The driver needs not to be in the vehicle and is not in control of the vehicle at any time. This type of vehicle can activate the driving device on its own and does not need to be driven on designed road conditions throughout the entire journey. It can perform all important safety-related functions, including situations when no one is on the vehicle. It does not need to be controlled by the driver's will at all. Instead, it can make decisions independently. (For automatic cars without steering wheel)

At present, most of the self-driving vehicles with a high market share are level 2. When such vehicles turn on the level 2 assisted driving system, the vehicle can autonomously complete lane changes, ramp entering, and ramp exiting under the driver's supervision. This is just like a person driving a car. In this state, the car has the ability to sense (collect road information), make decisions (know how to drive), and execute (execute planned strategies).

Recently, it was discovered that many level 2 self-driving vehicles, after driving more than ten kilometers on highways with assisted driving, suddenly encountered a car that rolled over on the road without any alarm or deceleration. The self-driving vehicles directly hit the rolled-over car, leading to tragedy.

It is obvious that these vehicles have problems in sensing. Currently, most of these level 2 self-driving vehicles sense through forward-looking cameras and millimeter-wave radars to determine the objects ahead and determine road conditions. Regardless of whether they use the rule-based vision algorithm or the deep learning technology, there are inherent and unchangeable flaws of inability in recognizing some targets.

The first is a situation that has not been seen before. The training data set cannot completely cover all targets in the real world. It is deemed good to cover 10%. The remaining 90% cannot be recognized if it has never been seen before, let alone in the real world. In the real world, new irregular targets are generated every moment, such as cars broken down on the road.

The second situation is that the image lacks texture features. It is like putting a piece of white paper in front of the camera. Undoubtedly, it is not possible to identify what object it is. At a certain moment, the side of some large trucks with high chassis or a white wall is just like white paper. Then, the machine vision based on deep learning is like a blind man and the car will hit the target without deceleration.

In order to make up for this mistake, millimeter-wave radar is introduced on the basis of vision. Millimeter-wave radar will directly filter out some stationary objects or suspected stationary objects through algorithms to avoid erroneous reactions. Unfortunately, if a truck is stationary or moving very slowly, millimeter-wave radar will not detect it and accidents might still occur.

Accordingly, self-driving vehicles cannot use sensors to identify slow-moving or even stopped obstacles and thus avoid directly colliding with them without warning or slowing down. This is a problem to be solved by those skilled in the art.

SUMMARY OF THE INVENTION

An objective of the present invention is to provide a method for detecting stationary objects by vehicles moving at high speed, so as to prevent self-driving vehicles from being unable to recognize obstacles and causing irreparable tragedies to occur when they hit obstacles at full speed.

To achieve the above objective, the present invention provides a method for detecting stationary objects by vehicles moving at high speed. The method is applied to a vehicle, which includes an on-board computer, a depth image capture unit, a laser image capture unit, and an optical image capture unit. The on-board computer is connected electrically to the depth image capture unit, the laser image capture unit, and the optical image capture unit. The on-board computer executes the following steps of: when the vehicle moves at a first speed, the depth image capture unit, the laser image capture unit, and the optical image capture unit independently capturing a depth image, a laser image, and an optical image of a front side of the vehicle, respectively; the on-board computer receiving and merging the depth image, the laser image, and the optical image according to a fusion algorithm to give a merged image; the on-board computer analyzing and judging a stationary object in the merged image according to an image optical flow method and generating stationary object information including a relative distance between the stationary object and the vehicle and a second speed of the stationary object; and when the relative distance is smaller than a distance threshold value and the second speed is smaller than a speed threshold value, the on-board computer generating an alarm message. The depth image capture unit captures an angular range of the front side of the vehicle. The laser image capture unit captures the angular range of the front side of the vehicle. The image capture unit captures the angular range of the front side of the vehicle. Thereby, the identification of slow-moving or stationary obstacles can be done and hence preventing self-driving vehicles from being unable to identify obstacles and causing accidents.

According to an embodiment of the present invention, the depth image capture unit, the laser image capture unit, and the optical image capture unit independently perform capture in an angular range, respectively.

According to an embodiment of the present invention, the angular range extends from a central line of the front side of the vehicle along the horizontal plane to both sides by 120 degrees.

According to an embodiment of the present invention, the alarm message includes a sound message or/and a picture message.

According to an embodiment of the present invention, after the step of when the relative distance is smaller than a distance threshold value and the second speed is smaller than a speed threshold value, the on-board computer generating an alarm message, the method further comprises a step of the on-board computer controlling a brake unit to brake.

According to an embodiment of the present invention, the distance threshold value is 100, 70, 50, or 20 meters.

According to an embodiment of the present invention, the speed threshold value is 5 kilometers per hour.

According to an embodiment of the present invention, the capture range of the depth image capture unit is within 20 meters from the vehicle; the capture range of the laser image capture unit is within 100 meters from the vehicle; and the capture range of the optical image capture unit is within 200 meters from the vehicle.

According to an embodiment of the present invention, the first speed of the vehicle is greater than or equal to 60 kilometers per hour.

Accordingly, the present invention provides a method for detecting stationary objects by vehicles moving at high speed to solve the problem in the field.

BRIEF DESCRIPTION OF DRAWINGS

FIG. 1 shows a flowchart of the method for detecting stationary objects by vehicles according to the present invention;

DETAILED DESCRIPTION OF THE INVENTION

Figure 2A:
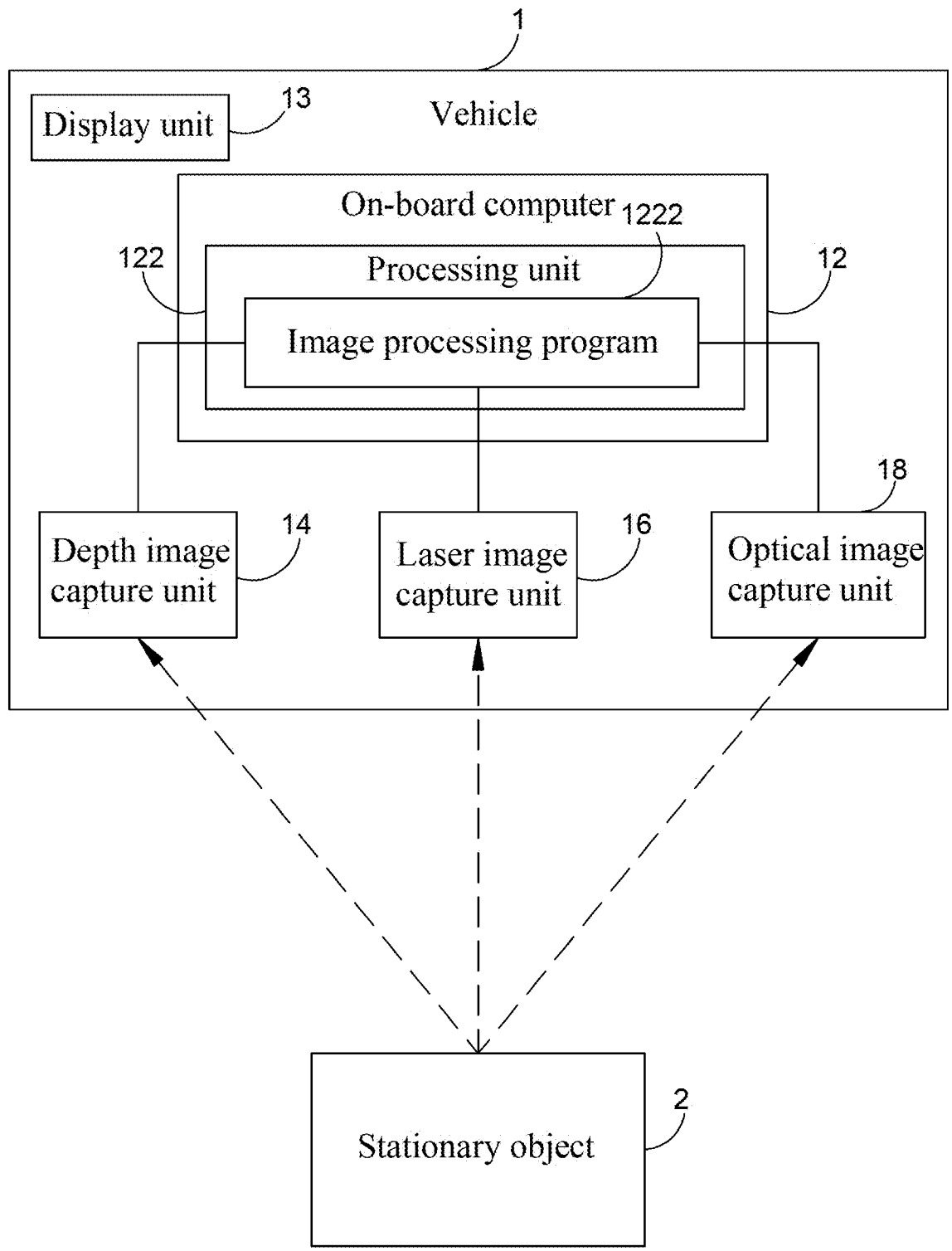
FIG. 2A shows a schematic diagram of image capture according to the present invention.

In order to make the structure and characteristics as well as the effectiveness of the present invention to be further understood and recognized, the detailed description of the present invention is provided as follows along with embodiments and accompanying figures.

Most commonly known self-driving vehicles use forward-looking cameras and millimeter-wave radars to sense the environment and collect road information. The road information is then transmitted to the control unit, and the control unit controls the vehicle's acceleration, deceleration, or steering operations. However, forward-looking cameras cannot judge unidentified objects and images without texture features. Millimeter-wave radars have a flaw when detecting stationary targets. They can detect stationary targets including buildings, vehicles, and pedestrians, etc., but the targets cannot be distinguished and identified very well, as well as being too sensitive to metal objects. Therefore, in order to avoid false operations, after obtaining the reflection data of radar, the radar will directly filter out some stationary objects or suspected stationary objects through algorithms to avoid erroneous response, Unfortunately, it will cause the autonomous driving to be unable to distinguish car accidents, slowly-moving construction vehicles, or large trucks with higher chassis.

The present invention adopts three different image capture units on a high-speed moving vehicle, namely, a depth image capture unit, a laser image capture unit, and an optical image capture unit. The three different sensors are disposed on the front side of the vehicle. The on-board computer then synthesizes and analyzes the images captured by the three different image capture units to determine whether a stationary object is included, the distance between the stationary object and the vehicle, and the speed of the stationary object and to display them on a display unit for reminding drivers to pay attention to stationary objects to avoid accidents.

In the following description, various embodiments of the present invention are described using figures for describing the present invention in detail. Nonetheless, the concepts of the present invention can be embodied by various forms. Those embodiments are not used to limit the scope and range of the present invention.

First, please refer to FIG. 1, which shows a flowchart of the method for detecting stationary objects by vehicles according to the present invention. As shown in the figure, how a vehicle detects a stationary object will be illustrated as follows.

Step S10: When the vehicle moves at a first speed, the depth image capture unit, the laser image capture unit, and the optical image capture unit independently capturing a depth image, a laser image, and an optical image of a front side of the vehicle, respectively;

Step S20: The on-board computer receiving and merging the depth image, the laser image, and the optical image according to a fusion algorithm to give a merged image;

Step S30: The on-board computer analyzing and judging a stationary object in the merged image according to an image optical flow method and generating stationary object information including a relative distance between the stationary object and the vehicle and a second speed of the stationary object; and Step S40: When the relative distance is smaller than a distance threshold value and the second speed is smaller than a speed threshold value, the on-board computer generating an alarm message.

Next, please refer to FIG. 2A, which shows a schematic diagram of image capture according to the present invention. A shown in the figure, the present embodiment is applied to a vehicle 1, which includes an on-board computer 12, a depth image capture unit 14, a laser image capture unit 16, and an optical image capture unit 18. The on-board computer 12 is connected electrically to the depth image capture unit 14, the laser image capture unit 16, and the optical image capture unit 18.

Next, the steps will be described in detail in the following.

Figure 2B:
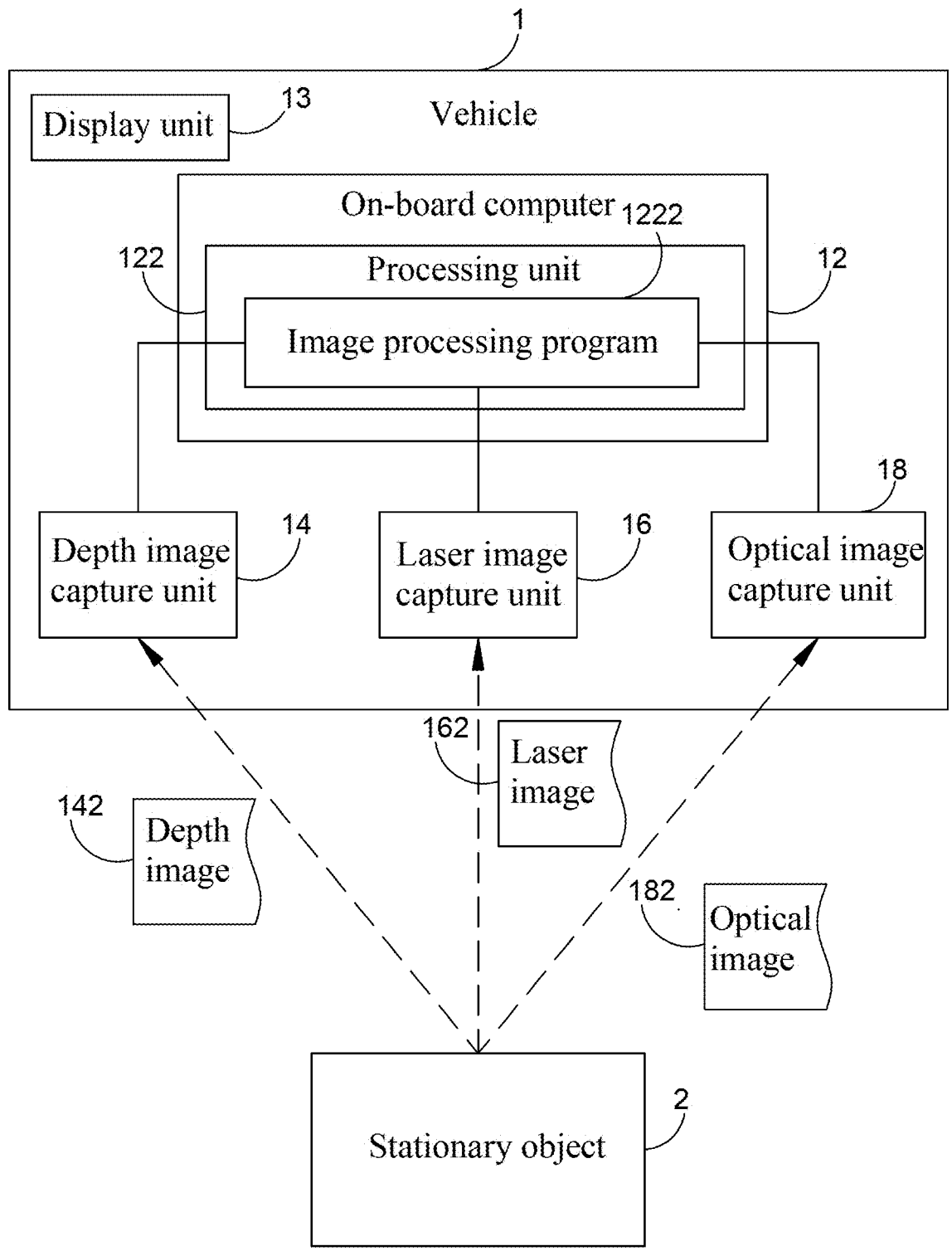
FIG. 2B shows a schematic diagram of image capture according to the present invention.

Please refer to FIG. 2A again and to FIG. 2B, which shows a schematic diagram of image capture according to the present invention. In the step S10, when the vehicle 1 moves at a first speed, the depth image capture unit 14 captures a depth image 142 of a front side of the vehicle 1. The depth image capture unit 14 according to the present embodiment is a 3D depth sensor. According to the present embodiment, the 3D depth sensor is further used to obtain the moving direction, speed, size, distance, and stationary object identification, etc. In addition, in this embodiment, the first speed is greater than or equal to 60 kilometers per hour. Alternatively, while driving on a highway, the depth image capture unit 14 captures an angular range of the front side of the vehicle 1. The angular range extends from a central line of the front side of the vehicle 1 along the horizontal plane to both sides by 120 degrees, or between the left and right rearview mirrors of the vehicle 1. The capture range of the depth image capture unit 14 is within 20 meters from the vehicle 1.

Please refer again to FIG. 2A and FIG. 2B. When the vehicle 1 moves at a first speed, the laser image capture unit 16 captures a laser image 162 of the front side of the vehicle 1. The laser image capture unit 16 according to the present embodiment is a lidar or a laser scanner. According to the present embodiment, the first speed is greater than or equal to 60 kilometers per hour. Alternatively, while driving on a highway, the laser image capture unit 16 captures an angular range of the front side of the vehicle 1. The angular range extends from a central line of the front side of the vehicle 1 along the horizontal plane to both sides by 120 degrees, or between the left and right rearview mirrors of the vehicle 1. The capture range of the laser image capture unit 16 is within 200 meters from the vehicle 1.

Please refer again to FIG. 2A and FIG. 2B. When the vehicle 1 moves at a first speed, the optical image capture unit 18 captures an optical image 182 of the front side of the vehicle 1. The optical image capture unit 18 according to the present embodiment is a color image capture unit, for example, an automotive CMOS image sensor. According to the present embodiment, the first speed is greater than or equal to 60 kilometers per hour. Alternatively, while driving on a highway, the optical image capture unit 18 captures an angular range of the front side of the vehicle 1. The angular range extends from a central line of the front side of the vehicle 1 along the horizontal plane to both sides by 120 degrees, or between the left and right rearview mirrors of the vehicle 1. The capture range of the optical image capture unit 18 is within 100 meters from the vehicle 1. Although the step S10 shown in FIG. 1 is performed concurrently, the present invention is not limited thereto. According to another embodiment, the step S10 can be performed in the same or different order as in FIG. 1.

Figure 2C:
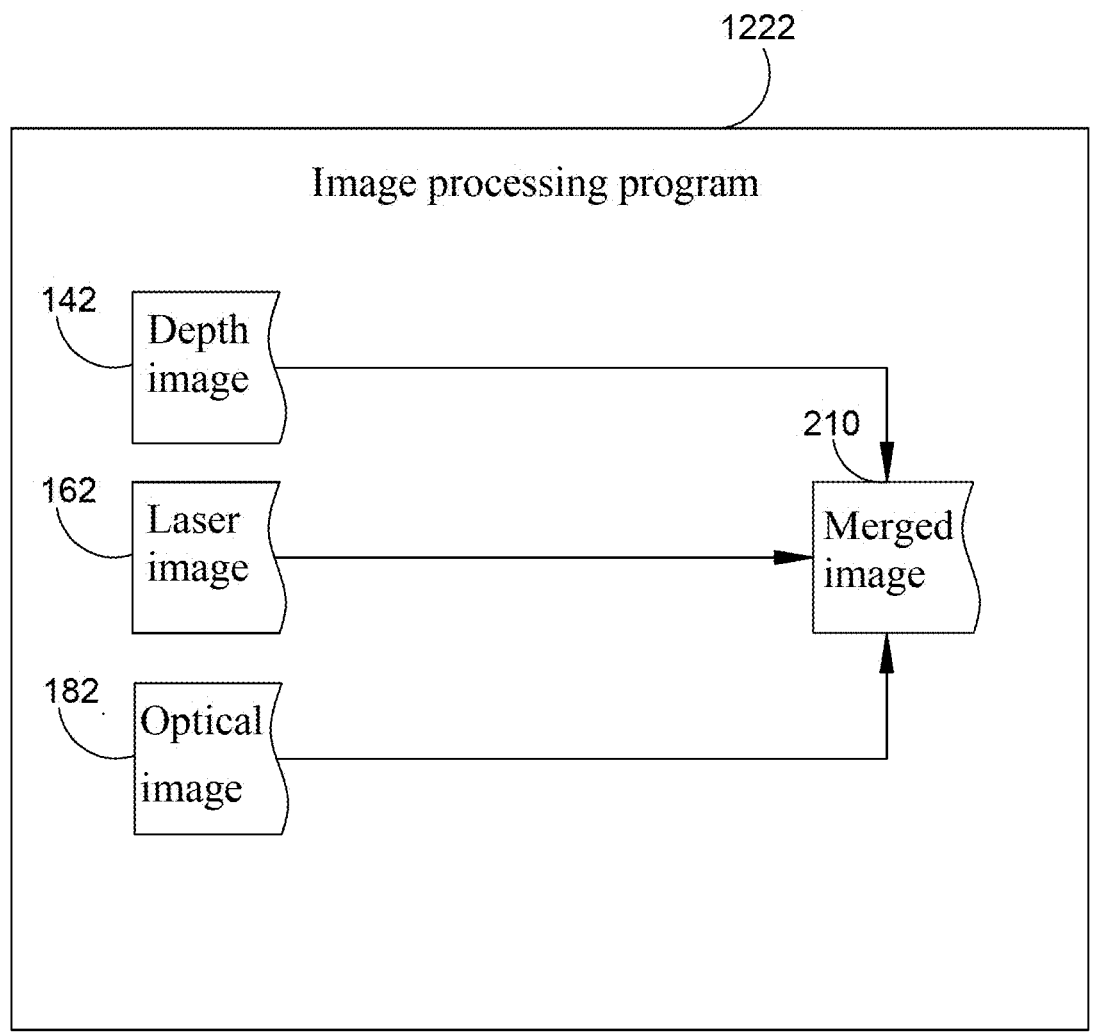
FIG. 2C shows a schematic diagram of image combination according to the present invention.

Please refer to FIG. 2C, which shows a schematic diagram of image combination according to the present invention. In the step S20, the on-board computer 12 receives and merges the depth image 142, the optical image 162, and the optical image 182 according to a fusion algorithm to obtain a merged image 210. According to the present embodiment, by comparing the stereoscopic image given by the laser capture unit 16 and the optical capture unit 18 with the infrared (IR) image given by the depth image capture unit 14, a more accurate external environment model of the vehicle 1 can be obtained.

According to the present embodiment, the fusion algorithm as described above is performed through a characteristic function f(x,y) shown in Equation (1). When x and y satisfy a fact, the value of the characteristic function will be 1.

$$f_i(x, y) \in \{0, 1\}, i = 1, 2, \ldots, m \qquad \text{Equation (1)}$$

The hidden state corresponding to a certain observation value is determined by the context (observation, state). The introduction of the characteristic function can select environmental characteristics (the combination of observations or states). It can be said that the characteristics (observation combinations) are used to replace observations for avoiding the limitations of the observational independence assumption for Naive Bayes in the hidden Markov model (HMM).

According to the training data $D=\{(x^{(1)}, y^{(1)}), (x^{(2)}, y^{(2)}), \ldots, (x^{(N)}, y^{(N)})\}$ with size T, an empirical expectation value (as shown in Equation (2)) and a model expectation value (as shown in Equation (3)) will be given. The learning of the maximum entropy model is equivalent to the optimization of constraints.

$$\tilde{E}(f_i) = \frac{1}{n} \sum_{x,y} p(x, y) f_i(x, y) \qquad \text{Equation (3)}$$

-continued $$E(f_i) = \frac{1}{n}\sum_{z,y} p(x)p(y\mid x)f_i(x, y) \quad \text{Equation (4)}$$

Assume that the empirical expectation value is equal to the model expectation value. Then there exist multiple sets C of conditional probability distribution pertinent to the arbitrary characteristic function fi, as shown in the following Equation (4):

$$C = \{P \mid E_p(f_i) = \tilde{E}_p(f_i), i = 1, 2, \ldots, m\} \quad \text{Equation (4)}$$

The principle of maximum entropy holds that the only reasonable probability distribution derived from incomplete information (such as a limited amount of training data) should have the maximum entropy value under the constraints provided by this information. That is, the distribution of maximum entropy under limited conditions is the optimal distribution. Therefore, the maximum entropy function model becomes a constrained optimization problem of convex functions.

$$\max_{P \in C} H(P) = -\sum_{x,y} P(x)P(y\mid x)\log P(y\mid x) \quad \text{Equation (5)}$$

$$\text{s.t. } E_p(f_i) = \tilde{E}_p(f_i), i = 1, 2, \ldots, m \quad \text{Equation (6)}$$

$$\text{s.t. } \sum_y p(y\mid x) = 1 \quad \text{Equation (7)}$$

We usually use the Lagrangian duality principle to transform the original formula into an unconstrained extreme value problem:

$$L(\omega, \alpha, \beta) = f(\omega) + \sum_{i=1}^{k}\alpha_i g_i(\omega) + \sum_{j=1}^{l}\beta_j n_j(\omega) \quad \text{Equation (8)}$$

$$\Lambda(p, \lambda) = \quad \text{Equation (9)}$$
$$H(y\mid x) + \sum_{i=1}^{m}\lambda_i(E_p(f_i) - \tilde{E}_p(f_i)) + \lambda_{m+1}\left(\sum_{y \in Y}P(y\mid x) - 1\right)$$

Find the partial derivative of the Lagrangian function with respect to p and make it equal to 0. By solving the equation, omitting intermediate steps, and rearranging terms, the following equations will be given:

$$p_{\tilde{\lambda}}^*(y\mid x) = \frac{1}{Z_{\tilde{\lambda}}(x)}\exp\left(\sum_{i=1}^{m}\lambda_i f_i(x, y)\right) \quad \text{Equation (10)}$$

$$Z_{\tilde{\lambda}}(x) = \sum_{y \in Y}\exp\left(\sum_{i=1}^{m}\lambda_i f_i(x, y)\right) \quad \text{Equation (11)}$$

Maximum-entropy Markov model (MEMM)

$$p_{y_{i-1}}(y_i\mid x_i) = \frac{1}{Z_{\tilde{\lambda}}(x_i, y_{i-1})}\exp\left(\sum_{a}^{m}\lambda_a f_a(x_i, y_i)\right), \quad \text{Equation (12)}$$
$$i = 1, 2, \ldots, T$$

Use $p(y_i\mid y_{i-1}, x_i)$ distribution to replace the two conditional probability distributions in HMM. It represents the probability of obtaining the current state from the previous state according to the observation value. That is, predict the current state based on the previous state and the current observation. Each such distribution function $p_{y_{i-1}}(y_i\mid x_i)$ is an exponential model obeying maximum entropy.

Assume that the points $\{p_1, p_2, \ldots, p_n\}$ on the discrete probability distribution and the maximum information entropy are found. To find the probability distribution $\{p_1, p_2, \ldots, p_n\}$. The maximum entropy formula is:

$$f(p_1, p_2, \ldots, p_n) = -\sum_{j=1}^{n} P_j \cdot \log_2 P_j \quad \text{Equation (13)}$$

The sum of $p_i$ at each point $x_i$ must be equal to 1:

$$g(p_1, p_2, \ldots, p_n) = \sum_{j=1}^{n} p_j = 1. \quad \text{Equation (14)}$$

Find the angle of maximum entropy by using Lagrange multipliers. $\vec{p}$ is across all $\{x_1, x_2, \ldots, x_n\}$ of the discrete probability distributions $\vec{p}$. The following condition is imposed:

$$\frac{\partial}{\partial \vec{p}}(f + \lambda(g-1))\big|_{\vec{p}=\vec{p}} = 0, \quad \text{Equation (15)}$$

It gives a system of equations Ñ with k=1, . . . , n, such that:

$$\frac{\partial}{\partial p_k}\left\{-\sum_{j=1}^{n} p_j \log_2 p_j + \lambda\left(\sum_{j=1}^{n} p_j - 1\right)\right\}\bigg|_{p_k=p_k^*} = 0. \quad \text{Equation (16)}$$

Expand these equations ñ and give the following equation:

$$-\left(\frac{1}{\ln 2} + \log_2 p_k^*\right) + \lambda = 0. \quad \text{Equation (17)}$$

It is apparent that all $p^*_k$ are equal (since they all depend on $\lambda$ only). By using the following constraint:

$$\sum_j p_j = 1 p_k^* = \frac{1}{n}. \quad \text{Equation (18)}$$

It gives $$p_k^* = \frac{1}{n}. \quad \text{Equation (19)}$$

Thereby, a uniform distribution is the maximum-entropy distribution:

$$\left| \frac{\sum_{j=1}^{n} P_j - P_k}{\sum_{j=1}^{n} P_j} \right| \quad \text{Equation (20)}$$

Equation (20) gives the maximum-entropy distribution. As shown in FIG. 2C, while merging the images, the overlap regions of the depth image 142, the laser image 162, and the optical image 182 are eliminated to generate the merged image 210.

Figure 2D:
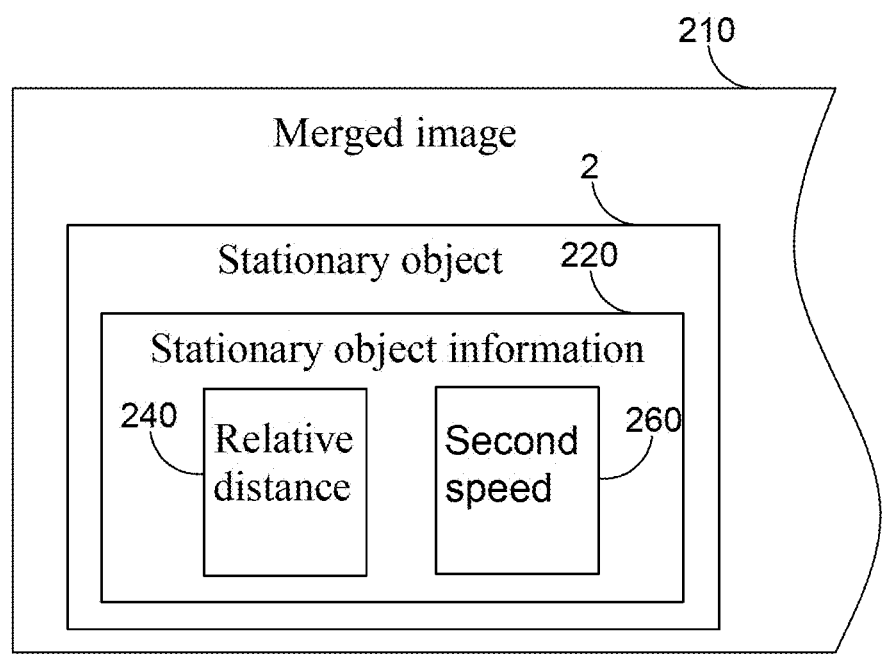
FIG. 2D shows a schematic diagram of the information of the stationary object according to the present invention.

Please refer to FIG. 2D, which shows a schematic diagram of the information of the stationary object according to the present invention. In the step S30, the on-board computer 12 analyzes and judges a stationary object 2 in the merged image 210 according to an image optical flow method and generating stationary object information 220 including a relative distance 240 between the stationary object 2 and the vehicle 1 and a second speed 260 of the stationary object 2.

Furthermore, according to the present embodiment, the method for judging the second speed 260 of the stationary object 2 will be illustrated. Please refer again to FIG. 2A to FIG. 2D. When the vehicle 1 continues to move forward, it captures a plurality of depth images 142, a plurality of laser images 162, and a plurality of optical images 182. According to a plurality of merged images 210, different relative distances 240 in the plurality of merged images 210 can be calculated. In addition, by using the first speed (not shown in the figures) of the vehicle 1, the second speed 260 of the stationary object 2 can be calculated.

The above-mentioned image optical flow method uses the Lucas-Kanade optical flow algorithm to calculate the position information of the stationary object 2.

First, use the image difference method to expand the image constraint equation using Taylor's formula and give:

$$I(x+y+z+t) + \frac{\partial I}{\partial x}\delta x + \frac{\partial I}{\partial y}\delta y + \frac{\partial I}{\partial z} + \delta z + \frac{\partial I}{\partial t}\delta t + H.O.T. \quad \text{Equation (21)}$$

H.O.T. means higher order terms and can be neglected for small displacement. According to the equation, it is obtained that:

$$\frac{\partial I}{\partial x}\delta x + \frac{\partial I}{\partial y}\delta y + \frac{\partial I}{\partial z} + \delta z + \frac{\partial I}{\partial t}\delta t = 0 \quad \text{Equation (22)}$$

or $$\frac{\partial I}{\partial x}\frac{\delta x}{\partial x} + \frac{\partial I}{\partial y}\frac{\delta y}{\partial x} + \frac{\partial I}{\partial z}\frac{\delta z}{\partial x} + \frac{\partial I}{\partial t}\frac{\delta t}{\partial x} = 0 \quad \text{Equation (23)}$$

Then, $$\frac{\partial I}{\partial x}V_x + \frac{\partial I}{\partial y}V_y + \frac{\partial I}{\partial z} + V_z + \frac{\partial I}{\partial t} = 0 \quad \text{Equation (24)}$$

$V_x$, $V_y$, $V_z$ are the x, y, z components of the optical flow vector of $I(x,y,z,t)$.

$\frac{\partial I}{\partial x}$, $\frac{\partial I}{\partial y}$, $\frac{\partial I}{\partial z}$ and $\frac{\partial I}{\partial t}$ are the difference toward the corresponding direction at the point $(x,y,z,t)$. Thereby, Equation (24) is converted to the following equation:

$$I_x V_x + I_y V_y + I_z V_z = -I_t \quad \text{Equation (25)}$$

Furthermore, rewrite Equation (25) as:

$$\nabla I^T \cdot \vec{V} = -I_t \quad \text{Equation (26)}$$

Since Equation (24) contains three unknowns (Vx,Vy,Vz), the subsequent algorithm is used to calculate the unknowns.

First, assume that $(V_x, V_y, V_z)$ are contact in a small cube with size m*m*m (m>1). Then a system of equations will be given for elements 1 ... n, $n=m^3$ as follows:

$$I_{x_1}V_x + I_{y_1}V_y + I_{z_1}V_z = -I_{t_1} \quad \text{Equation (27)}$$

$$I_{x_2}V_x + I_{y_2}V_y + I_{z_2}V_z = -I_{t_2}$$

$$\vdots$$

$$I_{x_n}V_x + I_{y_n}V_y + I_{z_n}V_z = -I_{t_n}$$

All of the above multiple equations contain three unknowns, forming a system of equations that are overdetermined equations. In other words, there is redundancy in the system of equations. The system of equations can be expressed as:

$$\begin{bmatrix} I_{x_1} & I_{y_1} & I_{z_1} \\ I_{x_2} & I_{y_2} & I_{z_2} \\ \vdots & \vdots & \vdots \\ I_{x_n} & I_{y_n} & I_{z_n} \end{bmatrix} \begin{bmatrix} V_x \\ V_y \\ V_z \end{bmatrix} = \begin{bmatrix} -I_{t_1} \\ -I_{t_2} \\ \vdots \\ -I_{t_n} \end{bmatrix}$$

Denoted as:

$$A\vec{v} = -b \quad \text{Equation (29)}$$

In order to solve the redundancy problem of this overdetermined equation, Equation (29) is obtained by using the least squares method:

$$A^T A \vec{v} = A^T(-b) \quad \text{Equation (30)}$$

or $$\vec{v} = (A^T A)^{-1} A^T(-b) \quad \text{Equation (31)}$$

Giving:

$$\begin{bmatrix} V_x \\ V_y \\ V_z \end{bmatrix} = \begin{bmatrix} \sum I_{x_i}^2 & \sum I_{x_i}I_{y_i} & \sum I_{x_i}I_{z_i} \\ \sum I_{x_i}I_{y_i} & \sum I_{x_i}^2 & \sum I_{x_i}I_{y_i} \\ \sum I_{x_i}I_{z_i} & \sum I_{x_i}I_{z_i} & \sum I_{x_i}^2 \end{bmatrix} \begin{bmatrix} \sum I_{x_i}I_{t_i} \\ \sum I_{y_i}I_{t_i} \\ \sum I_{z_i}I_{t_i} \end{bmatrix} \quad \text{Equation (32)}$$

Substitute the result of Equation (32) into Equation (24) to estimate the relative distance 240 and the second speed 260 of the stationary object information 220.

Figure 2E:
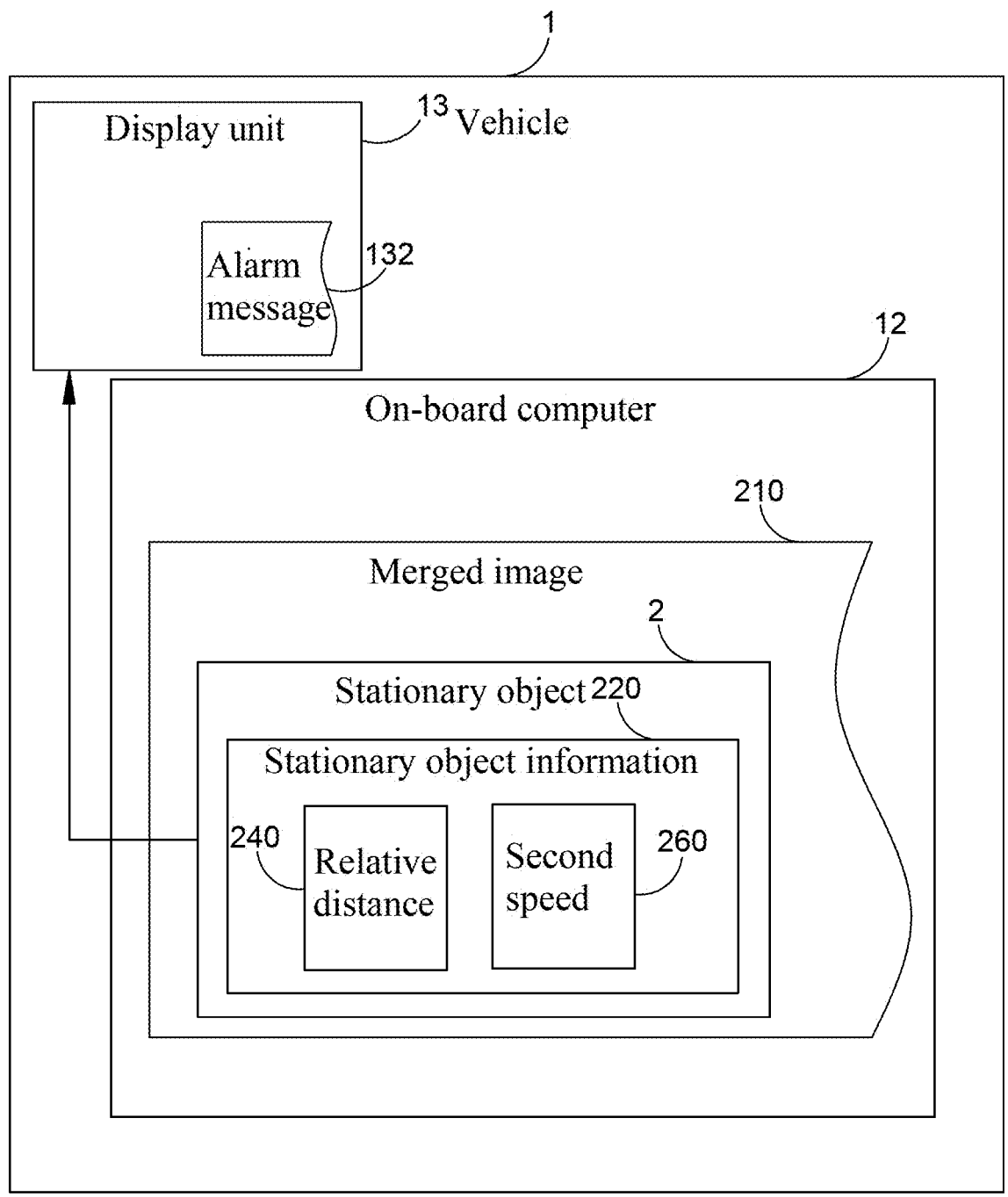
FIG. 2E shows a schematic diagram of the alarm message according to the present invention.

Finally, please refer to FIG. 2E, which shows a schematic diagram of the alarm message according to the present invention. In the step S40, when the relative distance 240 is smaller than a distance threshold value and the second speed 260 is smaller than a speed threshold value, the on-board computer 12 generates an alarm message 132. The alarm message 132 is a sound message or/and a picture message. The speed threshold value is 5 kilometers per hour. If the second speed 260 is smaller than the speed threshold value, the stationary object 2 is judged to be a stationary obstacle. Thereby, a moving obstacle and a stationary obstacle can be distinguished.

For example, the alarm message 132 is displayed on the display unit 13 and further includes an alarm sound.

That is to say, when the relative distance 240 between the vehicle 1 and the stationary object 2 is 100 meters, light indicators will appear on the windshield; when the relative distance 240 between the vehicle 1 and the stationary object 2 is 70 meters, light indicators will flash on the windshield; when the relative distance 240 between the vehicle 1 and the stationary object 2 is 50 meters, light indicators will flash on the windshield along with low-frequency short alarm sound; and when the relative distance 240 between the vehicle 1 and the stationary object 2 is 20 meters, light indicators will flash on the windshield along with high-frequency short alarm sound. In this way, different distances from the stationary object 2 can be distinguished, and different methods are adopted to remind the driver of the vehicle 1. It is understandable that the aforementioned alarm message 132 and alarm sound are only examples. A person having ordinary skill in the art can adjust the alarm method according to the practical application situations.

Figure 3A:
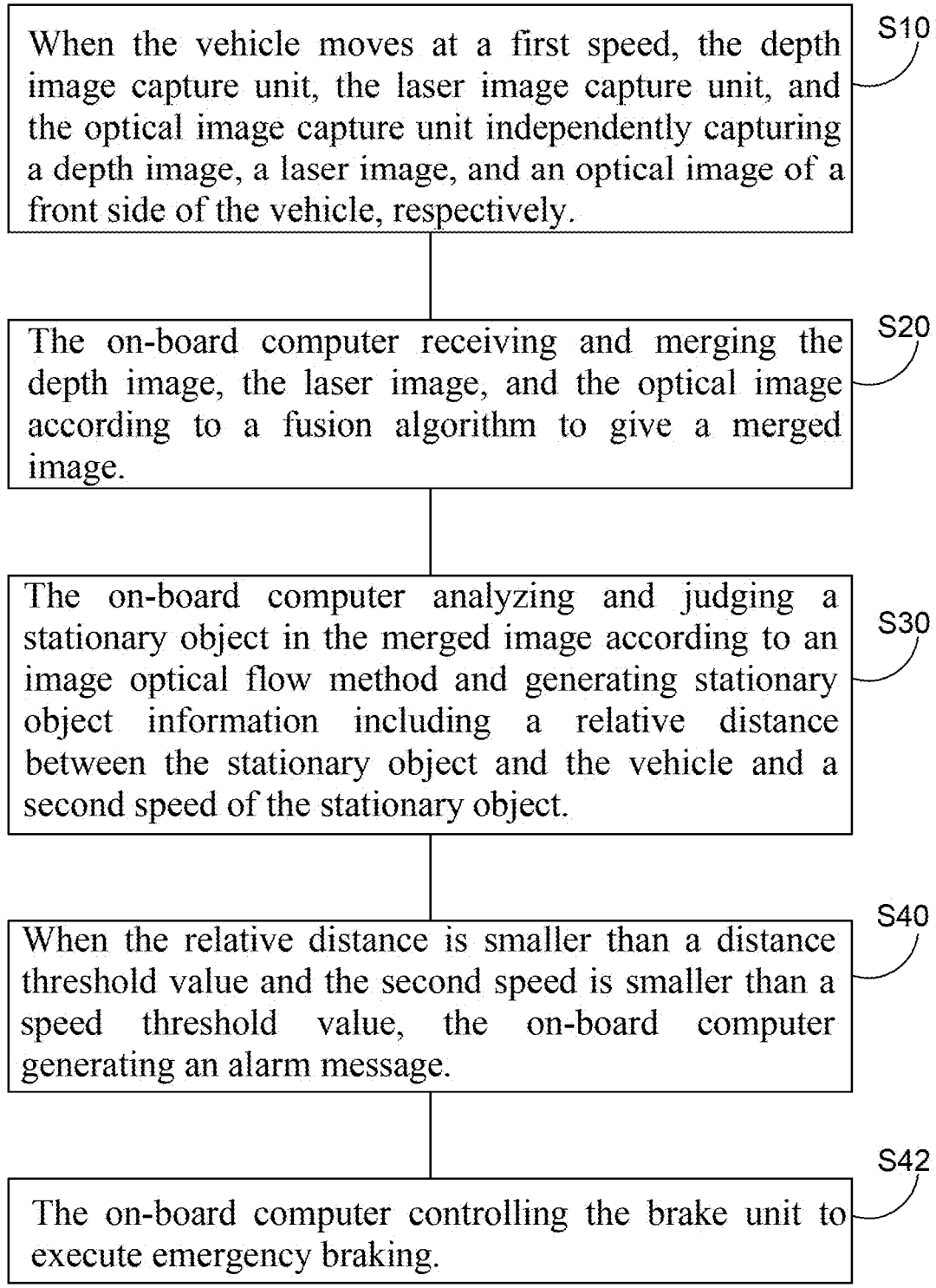
FIG. 3A shows a flowchart according to another embodiment of the present invention.
Figure 3B:
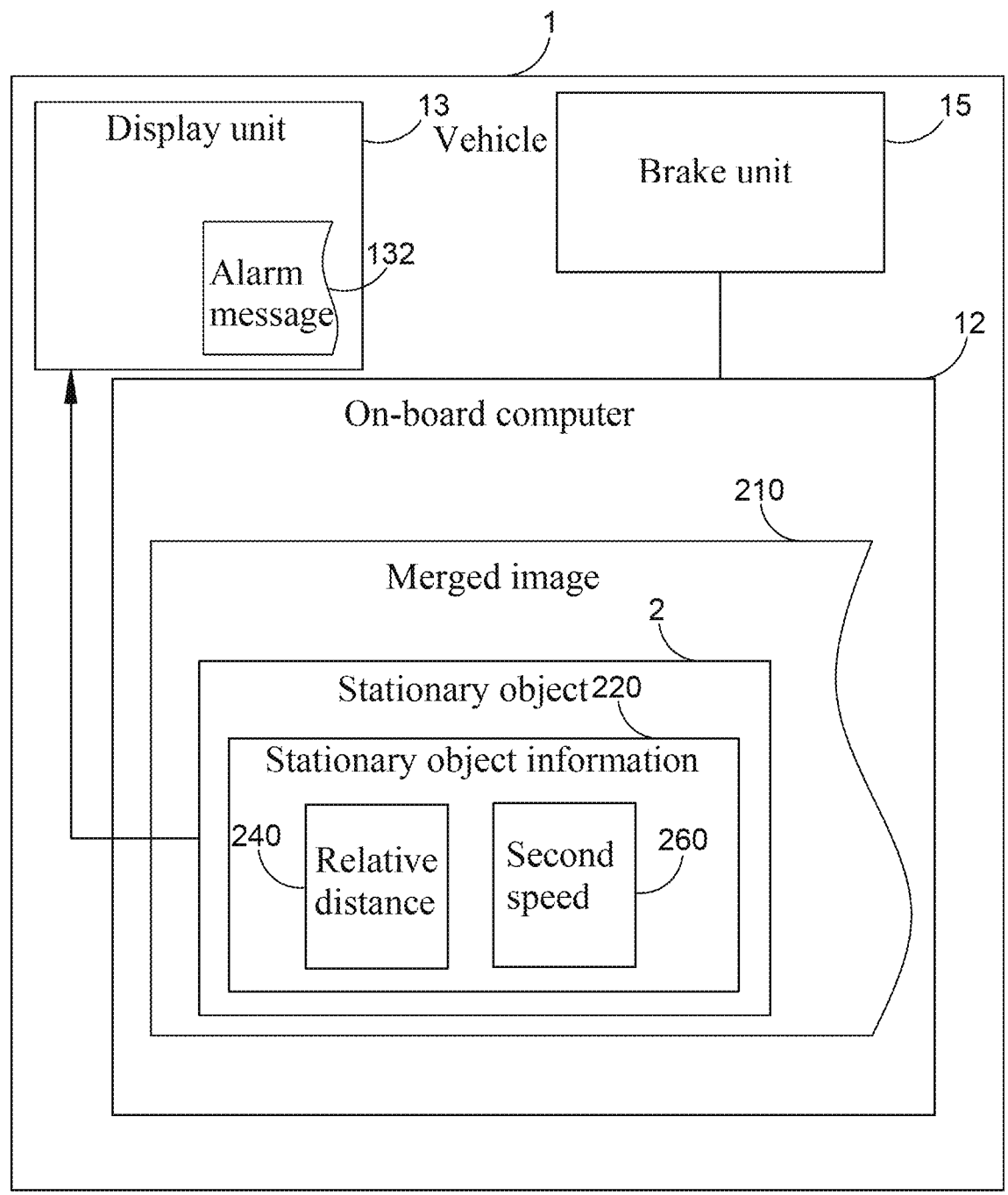
FIG. 3B shows a schematic diagram of controlling brake by self-driving.

Next, another embodiment will be provided. Please refer to FIG. 3A and FIG. 3B. FIG. 3A shows a flowchart according to another embodiment of the present invention; and FIG. 3B shows a schematic diagram of controlling brake by self-driving. As shown in the figure, the embodiment will be described as follows.

The steps S10 to S40 of the present embodiment have been illustrated as above and will not be repeated.

Step S42: The on-board computer controlling the brake unit to execute emergency braking.

Referring back to FIG. 3A and FIG. 3B, as shown in the figure, in the step S42, the on-board computer 12 controls a braking unit 15 to execute emergency braking, When the display unit 13 displays the stationary object 2 and the alarm message 132, the on-board computer 12 also controls the braking unit 15 to execute emergency braking to protect the safety of the driver, the passengers, and the vehicle 1.

For example, when the relative distance 240 between the vehicle 1 and the stationary object 2 is 100 meters, light indicators will appear on the windshield; when the relative distance 240 between the vehicle 1 and the stationary object 2 is 70 meters, light indicators will flash on the windshield; and when the relative distance 240 between the vehicle 1 and the stationary object 2 is 50 meters, light indicators will flash on the windshield along with low-frequency short alarm sound. When the relative distance 240 between the vehicle 1 and the stationary object 2 is 20 meters, light indicators will flash on the windshield along with high-frequency short alarm sound. At this time, the on-board computer 12 controls the braking unit 15 to execute emergency braking concurrently. By using different methods to remind the driver of the vehicle 1, it is thereby prevented that the driver does not execute emergency braking owing to inattention.

The above-mentioned embodiments and the method of the present invention provide a method for detecting stationary objects by vehicle moving at high speed. When the vehicle is traveling at high speed, a depth image capture unit, a laser image capture unit and an optical image capture unit are used to sense and obtain environmental information within 200 meters in front of the vehicle, Autonomous driving accidents will not occur because there are stationary or slowly moving objects in the environment that cannot be detected. In addition, different alarms will be provided at different distances between the vehicle and stationary objects for the driver to judge. Furthermore, when the driver is not paying attention, the on-board computer will execute emergency braking.

The present invention also uses depth images combined with lidar information to provide omnidirectional long- and short-distance depth information through information comparison and obtain a more accurate external environment model of the vehicle for distinguishing moving obstacles from stationary ones. The information can be used for better judgment by the on-board computer.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for detecting stationary objects by vehicles moving at high speed, applied to a vehicle, said vehicle including an on-board computer, a depth image capture unit, a laser image capture unit, and an optical image capture unit, said on-board computer connected electrically to said depth image capture unit, said laser image capture unit, and said optical image capture unit, and said on-board computer executing the following steps of:

when said vehicle moves at a first speed, said depth image capture unit, said laser image capture unit, and said optical image capture unit independently capturing a depth image, a laser image, and an optical image of a front side of said vehicle, respectively;

said on-board computer receiving and merging said depth image, said laser image, and said optical image according to a fusion algorithm to give a merged image;

said on-board computer analyzing and judging a stationary object in said merged image according to an image optical flow method and generating stationary object information including a relative distance between said stationary object and said vehicle and a second speed of said stationary object; and when said relative distance is smaller than a distance threshold value and said second speed is smaller than a speed threshold value, said on-board computer generating an alarm message.

2. The method for detecting stationary objects by vehicles moving at high speed of claim 1, wherein said depth image capture unit, said laser image capture unit, and said optical image capture unit independently perform capture in an angular range, respectively.

3. The method for detecting stationary objects by vehicles moving at high speed of claim 2, wherein said angular range extends from a central line of the front side of the vehicle along the horizontal plane to both sides by 120 degrees.

4. The method for detecting stationary objects by vehicles moving at high speed of claim 1, wherein said alarm message includes a sound message or/and a picture message.

5. The method for detecting stationary objects by vehicles moving at high speed of claim 1, after said step of when said relative distance is smaller than a distance threshold value and said second speed is smaller than a speed threshold value, said on-board computer generating an alarm message, further comprising a step of said on-board computer controlling a brake unit to brake.

6. The method for detecting stationary objects by vehicles moving at high speed of claim 1, wherein said distance threshold value is 100, 70, 50, or 20 meters.

7. The method for detecting stationary objects by vehicles moving at high speed of claim 1, wherein said speed threshold value is 5 kilometers per hour.

8. The method for detecting stationary objects by vehicles moving at high speed of claim 1, wherein the capture range of said depth image capture unit is within 20 meters from said vehicle; the capture range of said laser image capture unit is within 100 meters from said vehicle; and the capture range of said optical image capture unit is within 200 meters from said vehicle.

9. The method for detecting stationary objects by vehicles moving at high speed of claim 1, wherein said first speed of said vehicle is greater than or equal to 60 kilometers per hour.

* * * * *